Patented Apr. 17, 1945

2,374,067

UNITED STATES PATENT OFFICE 2,374,067

RESINOUS COMPOSITIONS AND ARTICLES OF MANUFACTURE COMPRISING THEM

Witty Lysle Alderson, Jr., Wilmington, Del., assignor to E. I. du Pont de Nemours & Company, Wilmington, Del., a corporation of Delaware No Drawing. Application July 19, 1943, Serial No. 495,352

18 Claims. (Cl. 260—36)

This invention relates to plasticized polyvinyl acetal compositions, and more particularly to plasticized polyvinyl butyral compositions.

The general utility of plasticized polyvinyl acetal compositions in cloth and wire coating applications has heretofore been limited on account of the relative high cost of the polymers, their inability to withstand extensive pigmentation with cheap fillers, and a degree of water sensitivity greater than is permissible in electrical insulating materials.

This invention has as an object the preparation of new and useful compositions of matter. A further object is the production of inexpensive plasticized polyvinyl acetal compositions which yield valuable coated fabrics and electrically insulated products. A still further object is to provide improved articles of manufacture comprising coated fabrics and insulated electrical conductors. Other objects will appear hereinafter.

The above objects are accomplished by blending or mixing intimately a polyvinyl acetal resin containing less than 25% unsubstituted or free hydroxyl groups with cycloaliphatic hydrocarbons which are obtained by decomposing acid sludges which are formed during the refining of petroleum and which have an iodine number of from 40 to 60 and correspond to the general formula $(C_3H_4)_n$ where $n$ has a value of from 8 to 25.

These cycloaliphatic hydrocarbons are known products of high boiling point obtained by decomposing selected acid sludges, e. g. waste products of the petroleum industry, with certain catalysts. Their preparation and properties are more fully described in an article by Rostler and Mehner in India Rubber World of August 1, 1941, pages 47 to 50, and in an article by Bornstein and Rostler in Modern Plastics of April 1942, as well as in United States Patents 2,185,-952, 2,185,951, and 2,217,919. These hydrocarbons, suitably processed to render them free from inorganic impurities, are available under the trade name of "Naftolen" in several grades which have essentially the same chemical composition but which vary in molecular weight from 300 to 1000 and in viscosity at 212° F. from 7 to 540 centipoises. Although all these grades are suitable for the present purpose, the best results are obtained with the product designated as Naftolen R-100 which comprises a mixture of the various grades of hydrocarbons of Naftolen and which has a viscosity at 212° F. of 21 centipoises. It is this product that is designated by the reference to unsaturated cycloaliphatic hydrocarbons in the examples given below.

The compositions of this invention can be prepared from polyvinyl acetal resins having less than 25% free hydroxyl groups. It is preferred to use polyvinyl acetals containing between 10% and 12% free hydroxyls because these resins are more compatible with the above described Naftolen and with other blending agents. By polyvinyl acetal resins is meant the condensation product obtained from hydrolyzed, polymerized vinyl esters, and aldehydes or ketones which have a plurality of carbon atoms. The aldehydes are those other than formaldehyde, and include acetaldehyde, propionaldehyde, butyraldehyde, furfuraldehyde, benzaldehyde, crotonaldehyde, and ketones such as acetone, cyclohexanone, cyclopentanone, etc. A method for their preparation is described in United States Patent 2,194,-613. The polyvinyl butyrals are preferred in the practice of this invention. The polyvinyl formals, obtained from formaldehyde, are inoperable for making the present compositions.

I have discovered that polyvinyl acetal resins when plasticized with the above mentioned cycloaliphatic hydrocarbons have, among other advantages hereinafter referred to, the ability to withstand an extraordinarily high degree of pigmentation with cheap pigments or fillers without adversely affecting other desirable properties.

The amount of these hydrocarbons used in the practice of this invention as plasticizers for polyvinyl acetal resins will depend on the ultimate properties desired in the finished product and will vary from 1% to 200% by weight of the acetal resin. For most purposes from 50% to 100% of the hydrocarbon plasticizer is adequate. But since it can be used in such large amounts as up to 200%, and is also quite cheap, it is possible and often advantageous to offset the high cost of the acetal resin by incorporating large amounts of the plasticizer with the resin.

In the preferred method for preparing the compositions of this invention the polyvinyl acetal and cycloaliphatic hydrocarbon are compounded in approximately equal parts by means of rolls heated to 40°-100° C. from which the composition is obtained as pliable sheets which may be processed further according to the ultimate use for which the product is intended. The plasticized acetal resin, for example, can be extruded in the form of tubes or can be calendered to cloth. Other methods of compounding, for instance by means of a suitable solvent, can also be used.

In order to obtain products which can be rendered tougher, insoluble, non-thermoplastic and free from tack by suitable heat treatment there is incorporated in the composition a thermosetting formaldehyde derivative in amount of from 1% to 40% based on the weight of the acetal resin although 1% to 20% is usually preferred. These thermosetting compounds include condensation products of formaldehyde with phenols, urea, urea derivatives, melamine and amides. Compositions having the most desirable properties are obtained with a monohydric alcohol-modified urea-formaldehyde resin obtained by the process described in United States Patent 2,191,957.

The invention is further illustrated by the following examples in which the parts are by weight.

Example I

One hundred parts of a polyvinyl butyral resin having a hydroxyl number of 159 (equivalent to approximately 12.5% free hydroxyl groups), 15 parts of a butanol-modified urea-formaldehyde resin, dissolved in butanol and 70 parts of the previously described mixture of unsaturated cycloaliphatic hydrocarbons (Naftolen R-100) are allowed to soak in about 100 parts of ethyl alcohol for several hours. The colloided mass is then compounded for 20 minutes on rolls heated to 70°–80° C. in order to remove the last traces of solvent. The composition is now ready for further processing. For instance, it can be extruded over wire by means of conventional equipment well known to the art to give a smooth, attractive coating which when heated for two hours at 120° C. becomes extremely tough and non-tacky at temperatures as high as 200° C. The heat treated insulation is, furthermore, pliable and not brittle at temperatures as low as −20° C., resistant to cold flow at moderate temperatures, and insoluble in organic solvents. The good electrical properties of insulations applied in this manner are but slightly affected by prolonged immersion in water. For instance, when dry the following values are obtained: dielectric constant 3.1, power factor (1000 cycles per second) 0.04, volume resistivity $10^{14}$ ohm-cm. After 48 hours in tap water at 20° C. the insulation has a dielectric constant of 3.8, a power factor at 1000 cycles/second of 0.06, and volume resistivity of $10^{14}$ ohm-cm.

If a mineral oil such as "Nujol," which is an essentially saturated aliphatic hydrocarbon mixture, is substituted for the unsaturated cycloaliphatic hydrocarbons used in the above example a crumbly material is obtained which cannot be sheeted on hot rolls except at very high temperatures to give hard brittle sheets. Thus it is evident that conventional mineral oils are not compatible with the preferred polyvinyl butyral resins used for preparing the compositions of this invention.

Example II

The following ingredients are colloided in a Werner & Pfleiderer mixer heated to 40°–50° C. by means of low pressure steam. One hundred parts of a polyvinyl butyral resin having about 12% free hydroxyl groups, 48 parts of a 60% solution of a butanol-modified urea-formaldehyde resin in butanol, 48 parts of acetylated castor oil, 24 parts of the mixture of unsaturated aliphatic hydrocarbons used in Example I, 4 parts of bone black and 75–100 parts of ethyl alcohol. The colloided polymer is removed from the mixer and thoroughly compounded on heated rolls as described in Example I. The composition obtained is eminently suited for electric insulation. For instance, when extruded over wire and baked for 45 minutes at 130°–135° C. it forms an insulation which is very tough, non-tacky at 200° C., insoluble in organic solvents, and which can be bent sharply at −40° C. without cracking. Its excellent water resistance and electrical properties are indicated by the following data obtained before (dry) and after (wet) 48 hours immersion in tap water at 20° C. Dielectric constants: dry 4.3, wet 4.9. Power factor at 1000 cycles/second; dry 0.05, wet 0.07. Volume resistivity: dry $10^{14}$ ohm-cm., wet approximately $10^{13}$ ohm-cm.

Example III

A composition which can be used to coat wire is obtained by colloiding 100 parts of a polyvinyl acetal resin obtained by reacting a hydrolyzed, polymerized vinyl ester with acetaldehyde and which has 80% of its hydroxyl groups acetalized, 25 parts of a 60% solution of a butanol-modified urea-formaldehyde resin in butanol, 70 parts of plasticizer consisting of the previously described unsaturated cycloaliphatic hydrocarbon mixture, and 50 parts of denatured ethyl alcohol in a Werner & Pfleiderer mixer heated to 40°–50° C. by means of low pressure steam. The colloided polymer is then removed from the mixer and compounded on rolls heated to 60°–70° C. until free from solvent.

Example IV

A composition eminently suited for coating cloth is prepared from the following materials as described below: one hundred parts of a polyvinyl butyral resin having a hydroxyl number of 159, 100 parts of the previously described mixture of unsaturated cycloaliphatic hydrocarbons, 25 parts of a 60% solution of a butanol-modified urea-formaldehyde resin in butanol, 5 parts dibutyl ammonium oleate, 100 parts ethyl alcohol, 75 parts crown clay, and 2 parts of colored pigment. These materials, with the exception of the clay and colored pigment, are mixed with a paddle and allowed to stand for two hours and then milled on a warm rubber mill (rolls heated to 40°–60° C.) until homogeneous and free from solvent. The clay and colored pigment are then milled into the composition, which is then transferred to a three roll calender mill having upper, center, and lower rolls heated at 70°, 75°, and 30° C., respectively. The composition is calendered as a 0.006″ film upon a light weight cotton sheeting which has been anchor coated as is described below. The coated fabric is dusted with a mixture of 25% talc and 75% cornstarch and is then cured by baking for two hours at 120° C. The cured coated fabric is not affected by boiling water, and when the sample is folded coated side against coated side and heated at 200° C. the coated surfaces show no tendency to stick together. The coated fabric does not crack upon folding at temperatures above −40° C. and in the cold crack test in which a sample is folded under a standard impact, does not fail at temperatures above −20° C.

The anchor coated fabric used above is prepared in the following manner: one hundred parts of a polyvinyl butyral resin (hydroxyl number 159), 100 parts of di-(secondary octyl)phthalate, 28 parts of a 60% solution of a butanol-modified urea-formaldehyde resin in butanol, 250 parts of denatured ethyl alcohol are stirred together until solution is complete. This solution is then applied to a light weight cotton sheeting by spreading with a doctor knife. A film weighing about 1 oz./sq. yd. after evaporation of the solvent is applied in this manner.

In the manufacture of articles such as raincoats it is often preferable to use coated fabric which has not been cured, since this can be cemented more satisfactorily. For instance, the uncured coated fabric is cut to pattern, assembled, and cemented with an alcohol solution of the following materials: one hundred parts of a polyvinyl butyral resin (hydroxyl number 159), 75 parts di(sec.-octyl) phthalate, 50 parts of the previously described unsaturated cycloaliphatic hydrocarbon plasticizer, 25 parts of a 60% solution of butanol-modified urea-formaldehyde resin in butanol, 75 parts crown clay, and 2 parts color pigment. Following assembly and cementing, the coats are cured for one hour at 260° F. to render the coating and seams insoluble and non-thermoplastic.

*Example V*

A composition is prepared from the following materials by the method described in Example III. One hundred parts of a polyvinyl butyral resin of hydroxyl number 159, 30 parts of di(sec.-octyl) phthalate, 100 parts of the previously described unsaturated cycloaliphatic hydrocarbon plasticizer, 28 parts of a 60% solution of a butanol-modified urea-formaldehyde resin dissolved in butanol, 5 parts dibutyl ammonium oleate, 300 parts crown clay, 2.8 parts color pigment. This composition is calendered with a three roll calender mill having upper, center, and lower rolls heated at 70°, 80°, and 35° C., respectively, upon the anchor coated sheeting described in Example III. The coated fabric, after curing for 1.5 hours at 120° C., is very soft and pliable. It is not softened by boiling water or by holding coated side against coated side at temperatures as high as 200° C. In spite of the large amount of clay filler employed, the coating is tough, abrasion-resistant, and does not crack when folded at temperatures above −20° C. or at temperatures above −15° C. in the cold crack test. The coated fabric is suitable for use in the manufacture of raincoats. Coats and other articles which have cemented seams are preferably fabricated from the uncured coated fabric and subsequently cured by baking as is described in Example IV.

To impart certain additional specific properties to the finished compositions and to adapt them to specified uses it is often desirable to use the previously described unsaturated cycloaliphatic hydrocarbon plasticizer in conjunction with other plasticizers. Thus, if a high order of low temperature pliability and toughness are desired, the mixture of unsaturated cycloaliphatic hyrocarbons used in the examples can be blended with various amounts, depending on the degree of flexibility desired, of castor oil, acetylated castor oil, phthalic esters such as dicaprylphthalate, dioctyl phthalate, dibutyl phthalate, dibutoxyethyl phthalate; or esters of higher aliphatic acids such as butyl sebacate, methyl acetyl ricinoleate, dibutyl Cellosolve sebacate, di-(butylcarbitol)-glutarate; or esters of phosphoric acid such as tricresyl phosphate, trioctyl phosphate, or triphenyl phosphate.

The compositions of this invention can be prepared by means of the standard type of mixing equipment available to the chemical industry. Although it is generally more expedient to soften the polyvinyl acetal resin with a low boiling solvent such as acetone or a lower aliphatic alcohol prior to compounding, this is not necessary and it is entirely feasible to mix the various ingredients directly by compounding at elevated temperatures (80°–150° C.).

The compositions of this invention can furthermore contain from 1% up to as much as 300%, based on the weight of the polyvinyl acetal resin, of cheap fillers such as clay without adversely affecting their inherent toughness, pliability, and good aging characteristics. Almost any type of pigment or filler can be used for this purpose; for instance, carbon black, bone black, clay, barytes, titanium dioxide, zinc oxide, calcium sulfate, calcium hydroxide, magnesium carbonate, various dyes and colored pigments, etc. This fact, together with the feasibility of using unusually large amounts of the previously described unsaturated cycloaliphatic hydrocarbon plasticizers makes possible the production of inexpensive but valuable polyvinyl acetal resin compositions containing but a relatively small amount of the resin.

In addition to being adaptable to calendering, friction coating, extrusion and spreading techniques, the new compositions of polyvinyl acetal resins and cycloaliphatic hydrocarbons described herein can be applied from solution. This latter method is particularly advantageous in the coating of wire, e. g. in magnet wire coating.

The ability, previously mentioned, of the present compositions to withstand an exceptionally high degree of pigmentation with cheap fillers and the resultant decrease in cost thus effected renders them very useful as fabric coating compositions for use in the manufacture of raincoats, sport jackets, hospital sheeting, upholstery, fuel cells, water containers, luggage, footwear, and protective coverings such as tarpaulins, tents, sleeping bags, automobile tops, awnings, etc. Their excellent electrical properties and high degree of water resistance, as well as their good aging characteristics, enhance their utility as insulation for various types of electrical conductors such as communications wires, ordinary household wiring, lamp cords, etc. They are also useful in preparing protective jackets for all types of electric cables. In addition, these compositions can be used to prepare molded articles of all kinds, abrasive compositions, adhesives, caps, closures, collapsible containers, tubes, rods, tapes, fibers, storage battery plate separators, wrapping foils, shoe soles and heels, gaskets for preserving jars, etc.

As many apparently widely different embodiments of this invention may be made without departing from the spirit and scope thereof, it is to be understood that I do not limit myself to the specific embodiments thereof except as defined in the appended claims.

I claim:

1. A composition of matter comprising a polyvinyl acetal resin containing less than 25% free hydroxyl groups and in which the acetal portion is derived from a substance selected from the group consisting of aldehydes and ketones having at least two carbon atoms, with unsaturated cycloaliphatic hydrocarbons obtained by decomposing with alkaline neutralizing agents acid sludges formed in the refining of petroleum, said hydrocarbons having an iodine number of from 40 to 60, a viscosity at 212° F. of 7 to 540 centipoises and an approximate formula $(C_3H_4)_n$ where $n$ represents an integer of from 8 to 25.

2. A composition of matter comprising polyvinyl butyral resin containing less than 25% free hydroxyl groups plasticized with unsaturated cycloaliphatic hydrocarbons obtained by decomposing with alkaline neutralizing agents acid sludges formed in the refining of petroleum, said hydrocarbon having an iodine number of from 40 to 60, a viscosity at 212° F. of 7 to 540 centipoises, and an approximate formula $(C_3H_4)_n$ where $n$ represents an integer of from 8 to 25.

3. A composition of matter comprising a polyvinyl acetal resin containing less than 25% free hydroxyl groups and in which the acetal portion is derived from a substance selected from the group consisting of aldehydes and ketones having at least two carbon atoms, with unsaturated cycloaliphatic hydrocarbons obtained by decomposing with alkaline neutralizing agents acid sludges formed in the refining of petroleum, said hydrocarbons having an iodine number of from 40 to 60, a viscosity at 212° F. of approximately 21 centipoises and an approximate formula $(C_3H_4)_n$ where $n$ represents an integer of from 8 to 25.

4. The composition set forth in claim 1 in which said unsaturated cycloaliphatic hydrocarbon is present in amount of 1% to 200% based on the weight of the resin.

5. The composition set forth in claim 3 in which said unsaturated cycloaliphatic hydrocarbon is present in amount of 1% to 200% based on the weight of the resin.

6. A composition of matter which comprises a polyvinyl acetal resin containing less than 25% free hydroxyl groups and in which the acetal portion is derived from an aldehyde having at least two carbon atoms, a plasticizer comprising unsaturated cycloaliphatic hydrocarbons obtained by decomposing with alkaline neutralizing agents acid sludges formed in the refining of petroleum, said hydrocarbons having an iodine number of from 40 to 60, a viscosity at 212° F. of 7 to 540 centipoises and an approximate formula $(C_3H_4)_n$ where $n$ represents an integer of from 8 to 25, an inert filler in an amount of 1% to 300% based on the weight of the polyvinyl acetal resin, and in an amount of from 1% to 20% of a condensation product of formaldehyde with a substance of the group consisting of phenol, urea, and melamine.

7. A composition of matter which comprises polyvinyl butyral resin containing less than 25% free hydroxyl groups, a plasticizer comprising unsaturated cycloaliphatic hydrocarbons obtained by decomposing with alkaline neutralizing agents acid sludges formed in the refining of petroleum, said hydrocarbons having an iodine number of from 40 to 60, a viscosity at 212° F. of 7 to 540 centipoises and an approximate formula $(C_3H_4)_n$ where $n$ represents an integer of from 8 to 25, an inert filler in an amount of 1% to 300% based on the weight of the polyvinyl butyral resin, and in an amount of from 1% to 20% of a condensation product of formaldehyde with a substance of the group consisting of phenol, urea, and melamine.

8. The composition set forth in claim 7 in which said hydrocarbon has a viscosity at 212° F. of 21 centipoises.

9. The composition set forth in claim 6 in which said condensation product of formaldehyde is a monohydric alcohol-modified urea-formaldehyde resin.

10. The composition set forth in claim 7 in which said condensation product of formaldehyde is a monohydric alcohol-modified urea-formaldehyde resin.

11. An insulated electrical conductor in which the insulation comprises the composition set forth in claim 1.

12. An insulated electrical conductor in which the insulation comprises the composition set forth in claim 2.

13. An insulated electrical conductor in which the insulation comprises the composition set forth in claim 3.

14. An insulated electrical conductor in which the insulation comprises the composition set forth in claim 7.

15. An article of manufacture comprising a flexible fabric having a coating which is resistant to cracking on folding and which comprises the composition set forth in claim 1.

16. An article of manufacture comprising a flexible fabric having a coating which is resistant to cracking on folding and which comprises the composition set forth in claim 2.

17. An article of manufacture comprising a flexible fabric having a coating which is resistant to cracking on folding and which comprises the composition set forth in claim 6.

18. An article of manufacture comprising a flexible fabric having a coating which is resistant to cracking on folding and which comprises the composition set forth in claim 7.

WITTY LYSLE ALDERSON, Jr.